United States Patent [19]
Grohe

[11] 3,912,730
[45] Oct. 14, 1975

[54] 2,4,6-TRIOXO-TETRAHYDRO-1,3-OXAZINES

[75] Inventor: Klaus Grohe, Odenthal-Erberich, Germany

[73] Assignee: Bayer Aktiengesellschaft, Leverkusen, Germany

[22] Filed: Mar. 1, 1974

[21] Appl. No.: 447,406

[30] Foreign Application Priority Data
Mar. 9, 1973 Germany............................ 2311708

[52] U.S. Cl................................ 260/244; 424/248
[51] Int. Cl.² ............ C07D 265/00; C07D 273/00; C07D 295/00; A01N 9/00
[58] Field of Search...................................... 260/244

[56] References Cited
UNITED STATES PATENTS
3,725,402  4/1973  Disselkotter ................... 260/244 R FOREIGN PATENTS OR APPLICATIONS
2,137,649  2/1973  Germany Primary Examiner—Albert T. Meyers
Assistant Examiner—D. W. Robinson
Attorney, Agent, or Firm—Burgess, Dinklage & Sprung

[57] ABSTRACT

2,4,6-trioxo-tetrahydro-1,3-oxazines having the formula

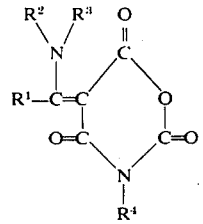

wherein:
R¹ is hydrogen, optionally branched $C_{1-12}$ alkyl or 5-membered or 6-membered cycloalkyl, said alkyl being optionally substituted by phenyl which in turn may be unsubstituted or substituted one or more times with fluorine, chlorine, bromine, $C_{1-3}$ alkyl or trifluoromethyl; in addition to which R¹ may represent phenyl or naphthyl which may be unsubstituted or substituted one or more times with $C_{1-3}$ alkyl or with trifluoromethyl;

R² and R³, which may be identical or different, each is hydrogen, optionally branched $C_{1-18}$ alkyl or 5-membered or 6-membered cycloalkyl, said alkyl being optionally substituted by phenyl which in turn may be unsubstituted or substituted one or more times with fluorine, chlorine, bromine or $C_{1-3}$ alkyl; and R² and R³ may also each represent phenyl or naphthyl, unsubstituted or substituted one or more times with fluorine, chlorine, bromine, alkoxy with 1 to 3 C-atoms or alkyl with 1 to 3 C-atoms; and R¹ and R² may also be joined together to form an alkyl bridge having 4 to 6 C-atoms, optionally interrupted by oxygen or sulfur; and R⁴ represents optionally branched alkyl containing 1 to 6 C-atoms or 5-membered or 6-membered cycloalkyl, said alkyl being optionally substituted by phenyl; R⁴ may also represent phenyl which may be unsubstituted or substituted with fluorine, chlorine, bromine, $C_{1-3}$ alkyl, trifluoromethyl, alkoxy with 1 to 3 C-atoms or $NO_2$.

6 Claims, No Drawings

2,4,5-TRIOXO-TETRAHYDRO-1,3-OXAZINES

This invention relates to new 2,4,6-trioxo-tetrahydro-1,3-oxazines and to a process for preparing them.

SUMMARY

It has been found that 2,4,6-trioxo-tetrahydro-1,3-oxazines are obtained when β-aminoacrylic acid esters of the general formula (I):

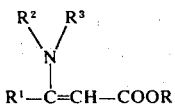

$$R^1-C=CH-COOR \quad (I)$$

in which:
- $R^1$ represents a hydrogen atom, an optionally branched $C_{1-12}$ alkyl group or a 5-membered or 6-membered cycloalkyl group in which the alkyl groups may be substituted by a phenyl group which in turn may be substituted in one or more positions by fluorine, chlorine, bromine, a $C_{1-3}$ alkyl group or the trifluoromethyl group; furthermore $R^1$ may represent a phenyl or naphthyl group which may be substituted in one or more positions by a $C_{1-3}$ alkyl or trifluoromethyl group;
- $R^2$ and $R^3$, which may be identical or different, each represents a hydrogen atom, an optionally branched $C_{1-18}$ alkyl group or a 5-membered or 6-membered cycloalkyl group, the alkyl groups being optionally substituted by a phenyl group which in turn may be substituted in one or more positions by fluorine, chlorine, bromine or a $C_{1-3}$ alkyl group; and $R^2$ and $R^3$ may also represent a phenyl or naphthyl group, which groups may be substituted once or more times by fluorine, chlorine, bromine or an alkoxy group with 1 to 3 C-atoms or an alkyl group with 1 to 3 C-atoms; and
- $R^1$ and $R^2$ may also be joined together by an alkylene bridge with 4 to 6 C-atoms which may be interrupted by oxygen or sulphur; and
- R may represent an alkyl group with 1 to 12 C-atoms or a 5-membered or 6-membered cycloalkyl group, the alkyl groups being optionally substituted by a phenyl group which in turn may be substituted by fluorine, chlorine, bromine and a $C_{1-3}$ alkyl group, are reacted with bis-(halocarbonyl)-amines of the formula (II):

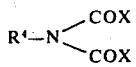

$$R^4-N\begin{matrix}COX\\COX\end{matrix} \quad (II)$$

in which
- X denotes a chlorine or bromine atom; and
- $R^4$ denotes an optionally branched chain alkyl group containing 1 to 6 C-atoms or a 5-membered or 6-membered cycloalkyl group, the alkyl group being optionally substituted by a phenyl group; $R^4$ may also represent a phenyl group which may be substituted by fluorine, chlorine, bromine, $C_{1-3}$ alkyl, trifluoromethyl, an alkoxy group with 1 - 3 C-atoms or an $NO_2$ group.

The new compounds obtainable by the process according to the invention correspond to the following general formula (III):

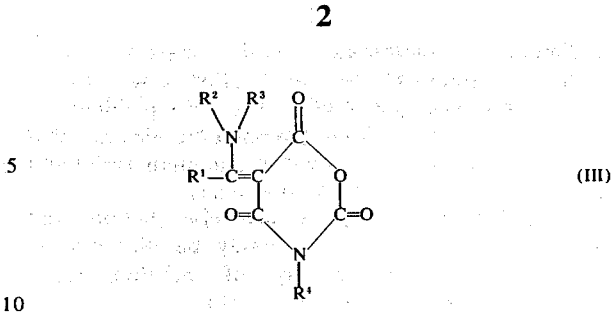

wherein the groups $R^1$, $R^2$, $R^3$ and $R^4$ have the meanings indicated above.

DESCRIPTION

The alkyl groups $R^1$–$R^4$ preferably contain 1 or 2 C-atoms.

It must be regarded as distinctly surprising that the β-aminoacrylic acid esters react with bis-(halocarbonyl)-amines by a process of C,O-cycloacylation to yield the 2,4,6-trioxo-tetrahydro-oxazines according to the invention, and do not react by a process involving the basic N-atom, i.e. a process of C,N-cycloacylation to yield pyrimidine diones. Another reason why the process according to this invention is surprising is that β-aminocrotonic acid esters react with chlorocarbonyl sulphenyl chloride by a process of C,N-cycloacylation to form 2-thiazolone-5-carboxylic acid esters (DOS No. 2,137,649).

The preferred β-aminoacrylic acid esters are those in which $R^1$ represents a methyl or phenyl group, $R^2$ and $R^3$ represent hydrogen, an alkyl group containing 1–4 C-atoms, a benzyl or cyclohexyl group or a phenyl group which is optionally substituted with an alkoxy group containing 1 or 2 C-atoms or with chlorine or with an alkyl group containing 1 or 2 C-atoms, and R represents an alkyl group containing 1–4 C-atoms or a benzyl or cyclohexyl group.

In the bis-(halocarbonyl)-amines, $R^4$ preferably represents a $C_1$ to $C_4$ alkyl group, a cyclohexyl group, a benzyl group or a phenyl group which is substituted with chlorine, methoxy, trifluoromethyl, methyl or an $NO_2$ group.

The β-aminoacrylic acid esters used as starting material are already known. They can easily be prepared by reacting acylacetoesters with ammonia or primary amines (Organicum, Organische Chem. Grundpraktikum VEB Deutscher Verlag der Wissenschaften, Berlin, page 354 (1964); J. Amer. Chem. Soc. 68, 514 (1946)), by reacting Grignard compounds with cyanoacetates (Collection of Czechoslovak. Chemical Communications 25, 607 (1960)) and by reacting propionic acid esters with ammonia or primary amines (Monatshefte fur Chemie 36, 109 (1915); Chem. Ber. 99, 2526 (1966); Nippon Kagaku Zasshi 82, 632 (1961)).

The following compounds are preferred for the reaction according to the invention: β-aminocrotonic acid methyl ester, β-aminocrotonic acid ethyl ester, β-aminocrotonic acid i-propyl ester, β-aminocrotonic acid n-dodecyl ester, β-aminocrotonic acid benzyl ester, β-aminocrotonic acid cyclohexyl ester, β-aminocrotonic acid β'-phenethyl ester, β-methylaminocrotonic acid ethyl ester, β-anilinocrotonic acid ethyl ester, β-benzyl-aminocrotonic acid ethyl ester, β-[p-chloroanilino]-crotonic acid ethyl ester, β-aminocinnamic acid ethyl ester, β-amino-β-ethyl acrylic acid ethyl ester, β-methyl-aminocinnamic acid ethyl ester, β-dimethyl-aminocrotonic acid methyl ester, β-dimethyl-aminocrotonic acid ethyl ester, β-pyrrolidino-crotonic acid methyl ester, β-piperidinocrotonic acid ethyl ester, β-morpholino-crotonic acid ethyl ester, β-dimethyl-aminocinnamic acid methyl ester and β-piperidino-cinnamic acid ethyl ester.

Bis-(halocarbonyl)-amines are also known and readily available. They can easily be obtained by halogenolytic ring opening of 3,5-dioxo-1,2,4-dithiazolidines (Synthesis 1970, 564).

The reaction according to the invention of β-aminoacrylic acid esters with bis-(halocarbonyl)-amines is preferably carried out at temperatures of from 0°C to 200°C, particularly 30°C to 150°C.

The β-aminoacrylic acid esters and bis-(halocarbonyl)-amines are generally reacted with each other in a molar ratio of from 1:1 to 1:2, preferably in an inert solvent, with external cooling to the lower limits of the temperature range until the exothermic reaction dies down. The reaction is then continued in the upper region of the temperature range until evolution of HCl ceases. The reaction is generally completed after 1 to 4 hours.

The liberated hydrogen chloride may, of course, be bound by one of the bases commonly used for this purpose, such as pyridine or triethylamine.

The inert solvents used for the process according to the invention may be hydrocarbons or chlorinated hydrocarbons, such as benzene, toluene, chlorobenzene, o-dichlorobenzene, carbon tetrachloride, trimethylene sulphone or dioxane.

The process according to the invention will now be described with the aid of the example of the reaction of β-methyl-aminocrotonic acid ethyl ester with bis-(chlorocarbonyl)-methylamine:

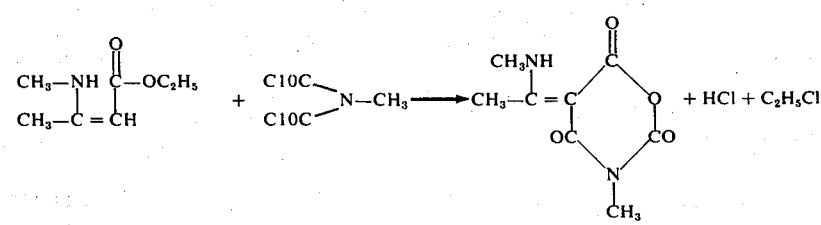

Trioxo-tetrahydro-oxazines prepared by this method can easily be purified by recrystallisation after the solvent has been removed by distillation.

2,4,6-trioxo-tetrahydro-oxazines are valuable starting materials for the synthesis of plant protective agents and may also be used directly as fungicides. 5-(1-benzylaminoethylidene)-3-methyl-2,4,6-trioxo-tetrahydro-1,3-oxazine of the formula

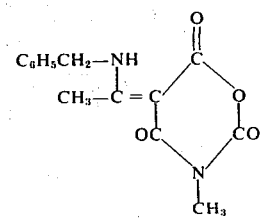

for example, prevents the widely spread disease of grey rot (*Botrytis cinerea*) when sprayed in a concentration of 0.0025 percent by weight, based on total composition.

| Botrytis-Test: | |
|---|---|
| Solvent: | 4.7 parts by weight of acetone |
| Dispersing agent: | 0.3 parts by weight of alkyl-aryl-polyglycol ether |
| Water: | 95 parts by weight. |

The quantity of active substance required for obtaining the desired concentration in the spray liquid is mixed with the specified quantity of solvent, and the concentrate is diluted with the specified quantity of water containing the above mentioned additives.

The spray liquid is used to spray young *vicia-faba* bean plants, variety Zwijndrechter, which have 3 - 4 leaf pairs, until they are wet enough to drip.

After 24 hours, the leaf pairs are removed and the individual leaves are placed in petri dishes, the lids and floors of which are lined with moist filter paper discs.

Filter paper discs 1 cm in diameter are dipped into an aqueous spore suspension of *botyrtis cinerea* and then placed on the treated leaves in the petri dishes. After an incubation period of 48 hours at 20°C, the necroses visible under the discs are assessed.

0 percent means no infection, 100 percent means that the infection is just as high as in control plants.

The active substance, the concentrations of active substance and results are shown in the following table.

| Active substance | Infection in % of infection of untreated control at a concentration of active substance (in %) of 0.0025 |
|---|---|
| 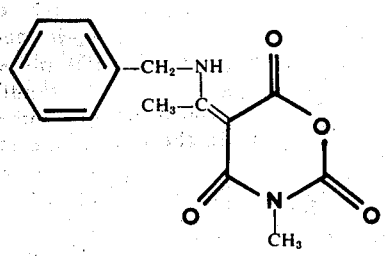 | 51 |

All 2,4,6-trioxo-tetrahydro-1,3-oxazines according to the invention have fungicidal properties.

EXAMPLE 1

50 g of bis-(chlorocarbonyl)-methylamine are added dropwise with stirring to a solution of 42.0 g (0.3 mol) of β-methyl-aminocrotonic acid ethyl ester in 100 ml of absolute dioxane with cooling to 10°–30°C. The reaction mixture is then heated to reflux until evolution of gas ceases, the solvent is distilled off under vacuum and the residue is recrystallised from ethanol. The colourless crystals of 5-(1-methyl-amino-ethylidene)-3-methyl-2,4,6-trioxo-tetrahydro-1,3-oxazine of the formula

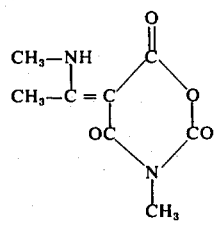

melt at 139° to 140°C. Yield: 38 g (64 percent of the theoretical). The same result was obtained when the reaction was carried out in chlorobenzene at a final temperature of 130°C.

EXAMPLES 2 TO 12

The 2,4,6-trioxo-tetrahydro-1,3-oxazines of the following formula

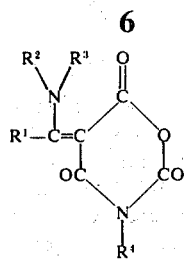

summarised in the table below were prepared in a manner analogous to that described in Example 1 by reacting 0.3 mol of the corresponding β-aminoacrylic acid ethyl ester with 50 g (0.38 mol) of bis-(chlorocarbonyl)-methylamine in 100 ml of absolute dioxane.

| No. | R¹ | R² | R³ | R⁴ | Yield (% of theory) | Mp. (°C) | Recrystallisation from |
|---|---|---|---|---|---|---|---|
| 2 | CH₃ | H | H | CH₃ | 40 | 202–203 | glacial acetic acid |
| 3 | CH₃ | C₆H₅ | H | CH₃ | 65 | 168–169 | toluene |
| 4 | CH₃ | CH₃ | CH₃ | CH₃ | 60 | 178–180 | ethanol |
| 5 | CH₃ | C₆H₅CH₂ | H | CH₃ | 80 | 135–136 | toluene |
| 6 | CH₃ | CH₃O—⟨⟩— | H | CH₃ | 70 | 150–151 | acetonitrile |
| 7 | C₆H₅ | H | H | CH₃ | 60 | 189–190 | ethanol |
| 8 | CH₃ | CH₃-⟨⟩- | H | CH₃ | 70 | 200–201 | acetonitrile |
| 9 | CH₃ | (CH₃)₂-⟨⟩- | H | CH₃ | 65 | 150–151 | ethanol |
| 10 | CH₃ | ⟨H⟩ | H | CH₃ | 85 | 172–173 | ethanol |
| 11 | CH₃ | CH₃ | H | C₆H₅ | 75 | 167–168 | acetonitrile |
| 12 | C₆H₅ | H | H | CH₃ | 60 | 172–173 | ethanol |

EXAMPLE 13

50 g of bis-(chlorocarbonyl)-methylamine are added dropwise to a solution of 42.9 g (0.3 mol) of β-methylaminocrotonic acid ethyl ester and 47.4 g (0.3 mol) of pyridine in 100 ml of absolute dioxane, with cooling to about 20°C and stirring. The reaction mixture is then stirred at room temperature for 30 minutes and at 60°C for 45 minutes. It is then poured into 250 ml of ice-water and the resulting precipitate is suction-filtered and recrystallised from ethanol. Yield: 36 g (60 percent of the theoretical) of the compound of the following formula:

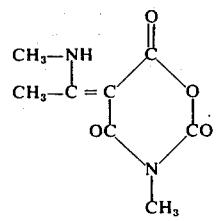

Mp.: 136° to 138°C.

EXAMPLE 14

50 g of bis-(chlorocarbonyl)-methylamine are added dropwise to a solution of 57.3 g (0.3 mol) of β-aminocrotonic acid benzyl ester in 100 ml of absolute dioxane, with cooling to 40°–60°C and stirring. The reaction mixture is then heated to boiling under reflux until evolution of gas ceases. The solvent is then distilled off under vacuum and the residue is recrystallised from acetic acid. 35 g of the compound of the following formula

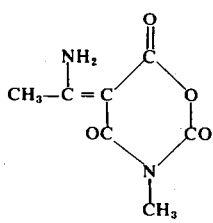

are obtained. Melting point 200°–202°C.

EXAMPLE 15

47.1 g (0.3 mol) of β-aminocrotonic acid n-butyl ester are reacted with 50 g of bis-(chlorocarbonyl)-methylamine and worked up in a manner analogous to that described in Example 9. 32 g of the compound of the following formula

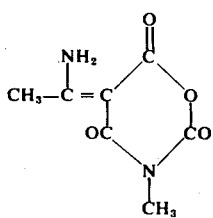

with a melting point of 200° – 202°C are obtained.

What is claimed is:

1. 2,4,6-trioxo-tetrahydro-1,3-oxazine having the formula

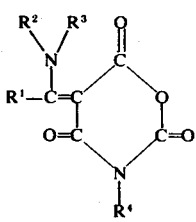

wherein:
$R^1$ is methyl or phenyl;
$R^2$ and $R^3$, which may be the same or different, each is selected from the group consisting of hydrogen, alkyl containing 1 to 4 C-atoms, benzyl, cyclohexyl and phenyl which may be optionally substituted by alkoxy or alkyl each with 1 or 2 C-atoms; and
$R^4$ is selected from the group consisting of $C_1$ to $C_4$ alkyl, cyclohexyl, benzyl, and phenyl.

2. The compound of claim 1 selected from the group consisting of 5-(1-methylaminoethylidene)-3-methyl-2,4-6-trioxo-tetrahydro-1,3-oxazine,
5-(1-aminoethylidene)-3-methyl-2,4-6-trioxo-tetrahydro-1,3-oxazine,
5-(1-phenylaminoethylidene)-3-methyl-2,4,6-trioxo-tetrahydro-1,3-oxazine,
5-(1-dimethylaminoethylidene)-3-methyl-2,4,6-trioxo-tetrahydro-1,3-oxazine,
5-(1-benzylaminoethylidene)-3-methyl-2,4,6-trioxo-tetrahydro-1,3-oxazine,
5-(1-p-methoxy-phenylaminoethylidene)-3-methyl-2,4,6-trioxo-tetrahydro-1,3-oxazine,
5-(1-aminobenzylidene)-3-methyl-2,4,6-trioxo-tetrahydro-1,3-oxazine,
5-(1-m-methyl-phenylaminoethylidene)-3-methyl-2,4,6-trioxo-tetrahydro-1,3-oxazine,
5-(1-o-methyl-phenylaminoethylidene)-3-methyl-2,4,6-trioxo-tetrahydro-1,3-oxazine,
5-(1-cyclohexylaminoethylidene)-3-methyl-2,4,6-trioxo-tetrahydro-1,3-oxazine,
5-(1-methylaminoethylidene)-3-phenyl-2,4,6-trioxo-tetrahydro-1,3-oxazine and
5-(α-aminobenzylidene)-3-methyl-2,4,6-trioxo-tetrahydro-1,3-oxazine.

3. Process for preparing the 2,4,6-trioxo-tetrahydro-1,3-oxazine of claim 1 which comprises reacting a β-amino-acrylic ester having the formula

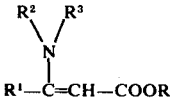

wherein
$R^1$ is methyl or phenyl; $R^2$ and $R^3$, which may be the same or different, each is selected from the group consisting of hydrogen, alkyl containing 1 to 4 C-atoms, benzyl, cyclohexyl and phenyl which may be optionally substituted by alkoxy or alkyl each with 1 or 2 C-atoms;
R is alkyl containing 1 to 12 C-atoms or 5-membered or 6-membered cycloalkyl, said alkyl being optionally substituted by phenyl optionally substituted by fluorine, chlorine, bromine or $C_{1-3}$ alkyl, with a bis-(halocarbonyl)-amine having the formula

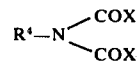

wherein
X is chlorine or bromine, and
$R^4$ is selected from the group consisting of $C_1$ to $C_4$ alkyl, cyclohexyl, benzyl and phenyl
said β-aminoacrylic acid ester and said bis-(halocarbonyl)-amine being reacted in a molar ratio of from 1:1 to 1:2 at a temperature of from 0° to 200°C.

4. Process of claim 3 wherein the temperature is from 30° to 150°C.

5. Process of claim 3 wherein the reaction is carried out in the presence of an inert solvent.

6. Process of claim 3 wherein the reaction is carried out in the presence of an acid acceptor.

* * * * *